(12) United States Patent
Sherman II

(10) Patent No.: US 6,971,485 B1
(45) Date of Patent: Dec. 6, 2005

(54) PARKING BRAKE LOCK

(75) Inventor: William E. Sherman II, Sourth, IN (US)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 10/711,050

(22) Filed: Aug. 19, 2004

(51) Int. Cl.$^7$ .............................................. F16D 55/02
(52) U.S. Cl. ..................... 188/72.7; 188/156; 188/162; 188/265
(58) Field of Search ............................. 188/72.1–72.9, 188/156, 157, 158, 159, 160, 161, 162, 265; 303/89

(56) References Cited

U.S. PATENT DOCUMENTS

| | | | | |
|---|---|---|---|---|
| 4,619,347 A | * | 10/1986 | Schreiner et al. | 188/72.6 |
| 5,038,895 A | | 8/1991 | Evans | 188/73.2 |
| 5,180,037 A | | 1/1993 | Evans | 188/72.2 |
| 5,921,354 A | | 7/1999 | Evans | 188/72.2 |
| 6,000,489 A | * | 12/1999 | Rick | 180/287 |
| 6,315,092 B1 | * | 11/2001 | Schwarz | 188/265 |
| 6,405,836 B1 | * | 6/2002 | Rieth et al. | 188/72.1 |
| 6,481,543 B1 | * | 11/2002 | Shaw et al. | 188/71.9 |
| 6,752,249 B1 | * | 6/2004 | Jungbecker et al. | 188/162 |

* cited by examiner

*Primary Examiner*—Matthew C. Graham
(74) *Attorney, Agent, or Firm*—Leo H McCormick, Jr.; Warren Comstock

(57) ABSTRACT

A locking mechanism for a disc brake that retains a clamping force that holds first and second friction members into engagement with a rotor to sustain a brake application. The locking mechanism is characterized by a first threaded member integrally attached to a piston located in a bore. The piston is moved within the bore to establish a clamping force and is prevented from rotating with respect to the bore by means of anti rotation members associated with the piston. A second threaded member rotates on the first threaded member with movement of the piston. A third member is moved into contact with the second threaded member to prevent rotation of the second threaded member and retaining clamping force on the friction members to affect a parking brake application.

14 Claims, 3 Drawing Sheets

PARKING BRAKE LOCK

BACKGROUND OF INVENTION

This invention relates to a locking mechanism to retains a clamping force that holds first and second friction members into engagement with a rotor to sustain a park brake application.

It was common for vehicles to have disc brakes on the front wheels and drum brakes on the rear wheels; however, currently it is common to have disc brakes on all four wheels. This requires a revision to the parking brake structure in the absence of drum brakes. A common type of park brake used with rear calipers are drum-in-hat brakes is disclosed in U.S. Pat. No. 5,180,037, integral piston brakes disclosed in U.S. Pat. No. 5,038,895 or a separate brake as disclosed in U.S. Pat. No. 5,921,354. All of these types of brakes require an input force from an operator applied through a lever to mechanically move friction members into engagement with a rotor or drum associated with a wheel to effect a parking brake application. Theoretically hydraulic pressure could be used to engage friction members with a rotor or drum, but hydraulic systems can leak and as a result of such a leak the clamping force may released thereafter allowing the vehicle to move on an inclined surface. In addition, federal regulations do not allow purely hydraulic means for holding park brake applications and require a mechanical means to hold park brake application and thereby lock the wheels. While the current federal regulations do not prohibit using hydraulic pressure to effect a parking brake application a mechanical backup must be provided for sustaining parking.

SUMMARY OF INVENTION

A primary purpose of the present invention is to provide a mechanical means to hold a park brake in an applied position after hydraulic pressure was used to initiate the park brake apply even after hydraulic pressure is removed.

The disc brake according to the present invention has a support member secured to a vehicle. The support member has first and second guides to align a caliper over a rotor associated with a wheel of a vehicle. The caliper has an actuation section connected by a bridge to an arm. The actuation section has a bore therein for retaining a piston to define an actuation chamber. A first friction member is connected to the arm on one side of the rotor and a second friction member is connected to the piston on the other side of the rotor so that the two friction members are aligned with each other on opposite sides of the rotor. The piston is prevented from rotating with respect to the second friction member by anti rotation members engaged with the piston. Pressurized fluid is presented to the actuation chamber which acts on the piston to develop a dynamic clamping force that urges the first and second friction members into engagement with the rotor to effect a brake application. The pressurized fluid has a predetermined pressure, which is sufficient to generate enough clamping for to lock the rotors associated with the wheels of a vehicle when the vehicle is on an incline.

An advantage of the disc brake provided by the present invention resides in the ability to maintain a static clamp force to engage friction members with a rotor in the absence of pressurized fluid.

A further advantage of the present invention resides in a locking mechanism that conforms to current federal parking brake regulations since it does not depend on hydraulic pressure to maintain a park brake apply.

DETAILED DESCRIPTION

Figure 1:
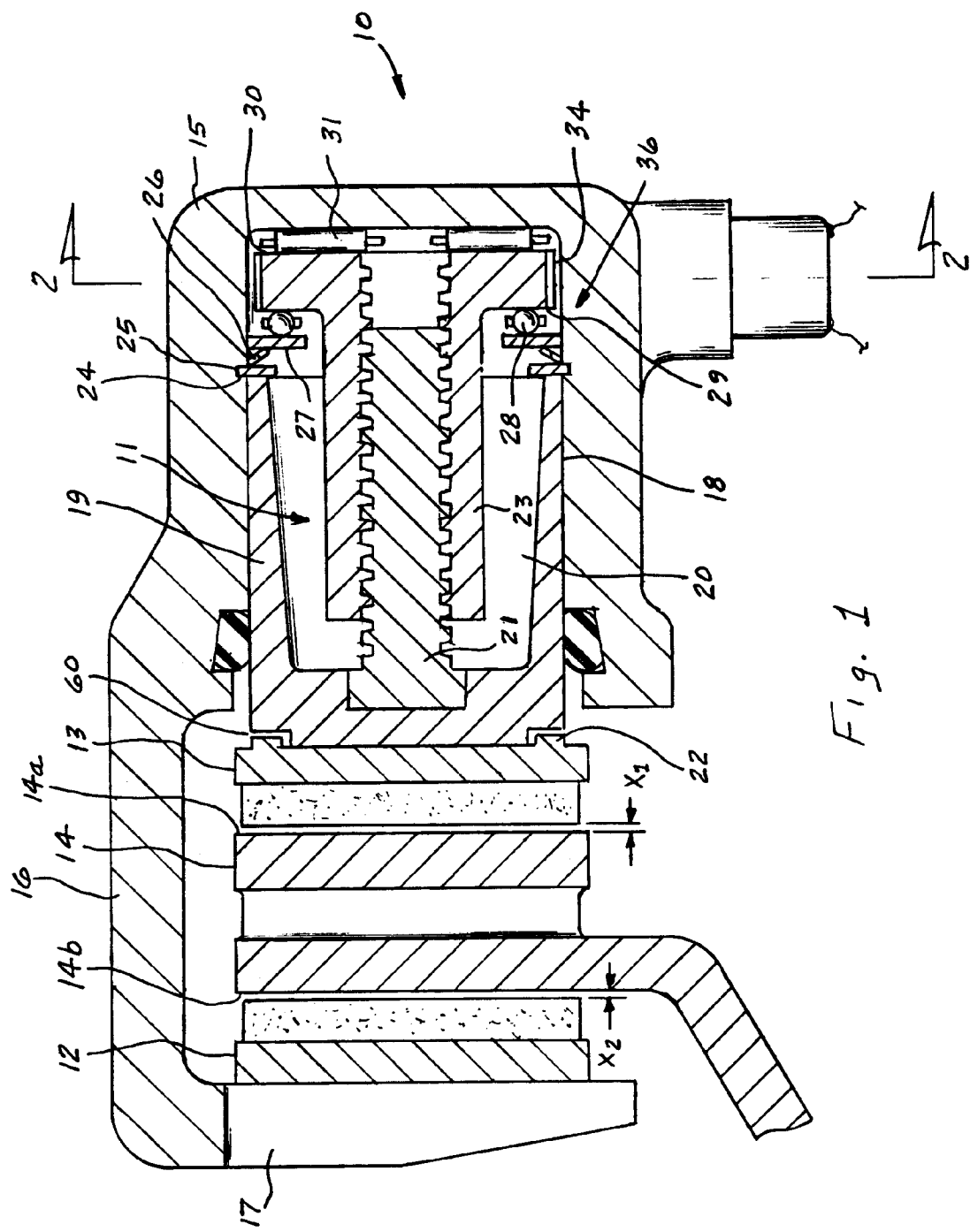
FIG. 1 is a schematic illustration of a disc brake made according to the present invention.
Figure 3:
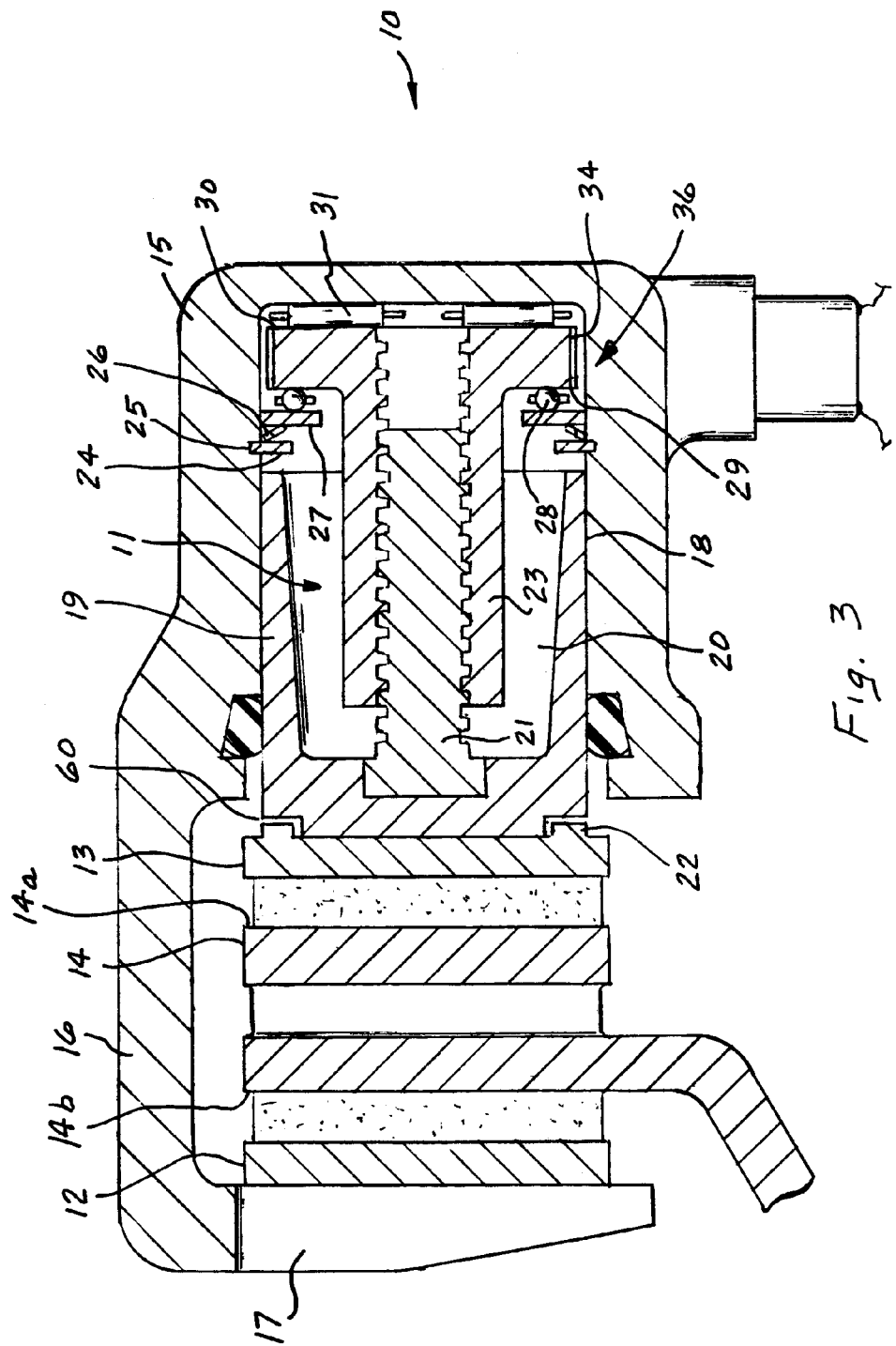
FIG. 3 is a sectional view of the disc brake in FIG. 1 with a piston in an actuated position.

The disc brake 10 as shown in FIGS. 1 and 3 is utilized as a service brake and a parking brake in a vehicle and includes a locking mechanism 11 of the present invention. The locking mechanism 11 holds a first friction member 12 and a second friction member 13 into engagement with a rotor 14 during a park brake application.

The disc brake 10 has a housing that includes an actuation section 15 connected by a bridge 16 to an arm 17. The actuation section 15 has a bore 18 therein with a piston 19 to define an actuation chamber 20. The actuation chamber 20 also retains a locking mechanism 11. The first friction member 12 is connected to the arm 17 while the second friction member 13 is connected to piston 19 so that the first 12 and second 13 friction members are aligned on opposite sides of the rotor 14. The rotor 14 rotates with the wheel of a vehicle. During a brake application pressurized fluid is introduced into the actuation chamber 20 to exert a force on the piston 19. The force exerted on the piston 19 moves the second friction member 13 into engagement with the rotor 14 and the force is transmitted through the bridge 16 to the arm 17 which pulls the first friction member 12 into engagement with the rotor 14 to generate a clamping force. The clamping force can be selectively established by changing the pressure in fluid introduced into the actuation chamber 20 to effect a service brake apply for stopping a vehicle or maintained by the locking mechanism to affect a park brake apply.

Figure 2:
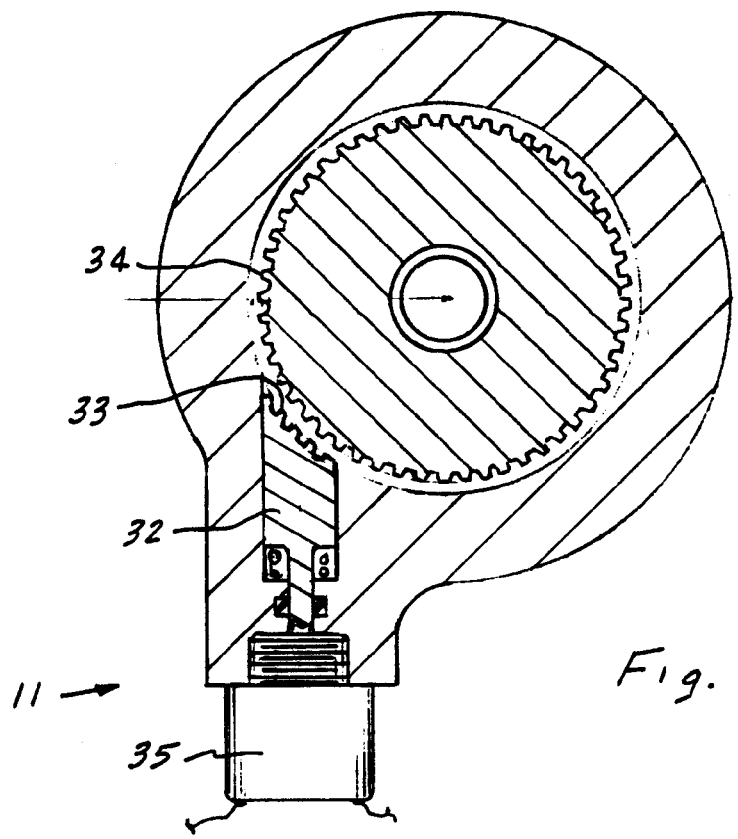
FIG. 2 is a sectional view taken along line 2—2 of FIG. 1.

The locking mechanism 11 is located within the actuation chamber and defined by a first threaded member 21 that is integrally attached to piston 19, a second threaded member 23 that rotates on first threaded member 21 by threads that mate with the first threaded member 21, and a bearing section 36. The bearing section 36 includes a snap ring 24 that is retained in a groove 25 in bore 18 wherein a preloaded wave washer 26 exerts against snap ring 24 and bearing washer 27. The bearing washer is urged against a first thrust bearing 28. The first trust bearing 28 presses against a first surface 29 on the second threaded member 23 to urge a second surface 30 thereon against a second trust bearing 31 positioned at the bottom of bore 18. The second threaded member 23 is able to rotate on the first threaded member 21 and has no lash threads that mate with the first threaded member 21. The first threaded member 21 moves forward with the piston 19 while the second threaded member 23 is restrained from moving forward. This restraint allows the second threaded member 23 to rotate within the actuation chamber 20. The first threaded member 21 is limited to linear movement as it is prevented from rotating with respect to the bore 18 by anti rotation members 22 (raised buttons on the backing plate) on the second friction member 13. The locking mechanism 11, as shown in FIG. 2, further includes a plunger 32 that is moved by a solenoid 36 to bring teeth 33 on the plunger 32 into engagement with teeth 34 on the second threaded member 23 when a park brake application is desired. The solenoid 36 could be replaced with a shaft that is moved by a manual input to being teeth 33 into engagement with teeth 34 to define the locking position.

MODE OF OPERATION

Figure 4:
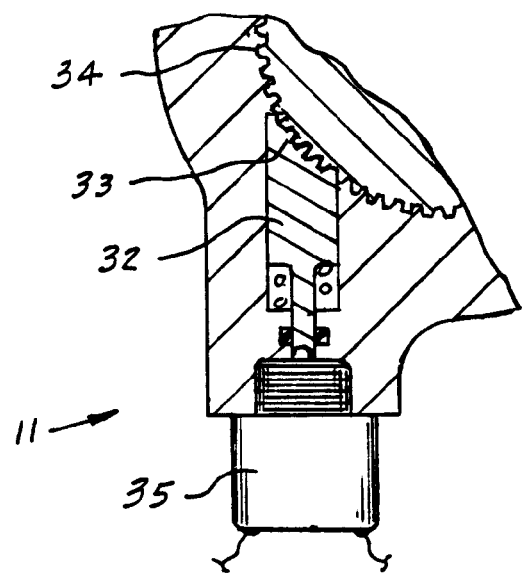
FIG. 4 is a sectional view of locking means that holds the piston in the actuated position to effect a parking brake application.

When a vehicle is moving the disc brake 10 is in off brake position as illustrated in FIG. 1, with the first 12 and second 13 friction members are separated from the rotor 14 by a small distance. When an operator of a vehicle that includes a disc brake 10 desires to stop the vehicle, an input force is applied to a brake pedal and a control valve is actuated to supply hydraulic fluid from a remote source to the actuation chamber 20. The pressurized hydraulic fluid in the actuation chamber 20 acts on piston 19 to exert a separation force that extends the piston toward the rotor 14 to engage the second friction member 13 with a first face 14a of the rotor 14. After second friction member 13 has contacted the first face 14a of the rotor 14 the force is transmitted through the bridge 16 to the arm 17 which pulls the first friction member 12 into contact with a second face 14b of the rotor 14. As the first 12 and second 13 friction members move to close the gaps X1 and X2 with the rotor the piston extends from the bore 18 a distance equal to the sum of X1 and X2 to fully extend the piston in a brake apply as illustrated in FIG. 3. As piston 19 moves to the fully extended position, a first threaded member 21 which is integrally attached to piston 19 also advances with the piston 19 in bore 18. The piston 19 and first threaded member 21 are prevented from rotating with respect to the second friction member 13 by the engagement of anti rotation members 22 with piston notches 60. The second threaded member 23 is able to rotate on first threaded member 21 and has no lash threads that mate with first threaded member 21. As first threaded member 21 moves forward with piston 19, the second threaded member 23 is restrained from moving forward which causes the second threaded member 23 to rotate. A brake application may be sustained by the locking mechanism 11 to effect a parking brake application. With the fluid pressure in chamber 20 and the piston 19 extended, a signal is provided to solenoid 36 to move plunger 32 and bring teeth 33 into engagement with teeth 34, as shown in FIG. 4. When teeth 33 are engaged with teeth 34 on the second threaded member 23 rotation is prevented, which prevents linear movement of first threaded member 21, which is integrally connected to piston 19 and prevents return movement of the piston from the extended position shown in FIG. 3 to the rest position of FIG. 1. Since the second threaded member 23 is prevented from rotating due to engagement with the plunger 32 pressurized fluid in chamber is no longer necessary to hold the extended position as shown in FIG. 3. Thus it is possible that the fluid pressure in chamber 20 may be eliminated and the clamping force is sustained until released by the operator. To release the parking brake application the operator introduces high pressure fluid to chamber 20 which acts on piston 19 and the teeth 33 are thereafter retracted from engagement and allows return of the piston to the rest position of FIG. 1 and release of the friction members from engagement as seen in FIG. 1.

I claim:

1. In a disc brake having a support member secured to a vehicle, said support member having first and second guides to align a caliper over a rotor associated with a wheel of a vehicle, said caliper having an actuation section connected by a bridge to an arm, said actuation section having a bore therein for retaining a piston to define an actuation chamber, a first friction member connected to said piston and a second friction member connected to said arm, said actuation chamber on being presented pressurized fluid from a source acting on said piston and actuation section to develop a dynamic clamping force for moving said first and second friction members into engagement with said rotor to effect a brake application, and said piston being prevented from rotating with respect to said second friction member by means of anti-rotation members engaged with said piston, a locking mechanism characterized by having a first threaded member integrally attached to said piston, a second threaded member able to rotate in said bore and having a plurality of teeth located at a closed end of said bore, and means for moving a third member into engagement with said teeth on second threaded member to affect a parking brake application by preventing rotation of said second threaded member and thereby holding said friction members in engagement with said rotor, said second threaded member being retained in the closed end of said bore by a retaining ring located in a groove in said bore and holding a preloaded wave washer against a bearing thrust washer to hold a first thrust bearing against a first face of said second threaded member adjacent to said piston, and a second thrust bearing engaging a second face of said second threaded member located adjacent the closed end of said bore, said second threaded member rotating as said piston moves said friction members into engagement with said rotor.

2. In the disc brake recited in claim 1, wherein said actuation chamber being presented pressurized fluid from a source acting on said piston and actuation section to develop a dynamic clamping force initially moving said first and second friction members into engagement with said rotor to effect a service brake application, and in an absence of pressurized fluid said locking mechanism maintaining said piston and the actuation section in said clamping position to provide a parking brake mode.

3. In a disc brake having a locking mechanism characterized by a first threaded member integrally attached to a piston located in a bore, said piston being moved within said bore to establish a clamping force and being prevented from rotating with respect to the bore by means of anti rotation members on the friction member in contact with the piston; a second threaded member rotating on said first threaded member with piston movement and having teeth thereon; and means for moving a third member into contact with said teeth on said second threaded member to prevent rotation of said second threaded member and retaining clamping force on said friction members to affect a parking brake application.

4. In the disc brake as recited in claim 3 said locking mechanism adjusts for wear in said first and second friction members and enables the locking mechanism to retain clamping force throughout the useful life of the friction members.

5. In a disc brake having a support member secured to a vehicle, said support member having first and second guides to align a caliper over a rotor associated with a wheel of the vehicle, said caliper having an actuation section connected by a bridge to an arm, said actuation section having a bore therein for retaining a piston to define an actuation chamber, a first friction member being connected to said piston and a second friction member being connected to said arm, said actuation chamber upon being presented pressurized fluid from a source acts on said piston and said actuation section to develop a dynamic clamping force for moving said first and said second friction members into engagement with said rotor to effect a service brake application, a first shaft having inner and outer surfaces with a face retained between a plurality of thrust bearings, said inner surface of said first shaft threadedly engages a second shaft, said second shaft having a first end threadedly engaging said inner surface of said first shaft and a second end fixed to said piston, said outer surface of said first shaft being located between said plurality of thrust bearings and having a plurality of protrusions thereon for selective engagement with a locking mechanism to maintain said dynamic clamping force to effect a parking brake application.

6. The parking brake as set forth in claim 5 wherein said locking mechanism mechanically interlocks with said plurality of protrusions on said outer surface of said first shaft to prevent rotation of said first shaft and maintain said dynamic clamping force.

7. The parking brake as set forth in claim 5 wherein said locking mechanism includes an engagement surface for mechanically interlocking with said plurality of protrusions on said outer surface of said first shaft.

8. The parking brake as set forth in claim 7 wherein said engagement surface includes a plurality of protrusions for mechanical interlocking with said plurality of protrusions on said outer surface of said first shaft.

9. The parking brake as set forth in claim 6 wherein said locking mechanism is actuated by an electronic means.

10. The parking brake as set forth in claim 9 wherein said electronic means maintains mechanical interlocking engagement with said plurality of protrusions on said surface of said first shaft to prevent rotation of said first shaft when power is lost.

11. The parking brake as set forth in claim 9 wherein said electronic means includes a solenoid for engaging and disengaging said engagement surface.

12. The parking brake as set forth in claim 11 wherein said solenoid can be released by a manual mechanical means.

13. The parking brake as set forth in claim 12 wherein said manual mechanical means includes a manual adjustor for mechanically moving said solenoid.

14. The parking brake as set forth in claim 6 wherein said locking mechanism is actuated by mechanical means.

* * * * *